(12) United States Patent
Spitz

(10) Patent No.: US 7,950,115 B2
(45) Date of Patent: May 31, 2011

(54) DEVICE FOR FASTENING AN ADD-ON PART TO A SUPPORT PART

(75) Inventor: Uwe Spitz, Rheinfelden (DE)

(73) Assignee: A. Raymond Et Cie, Grenoble (FR)

( * ) Notice: Subject to any disclaimer, the term of this patent is extended or adjusted under 35 U.S.C. 154(b) by 393 days.

(21) Appl. No.: 12/096,618

(22) PCT Filed: Dec. 7, 2006

(86) PCT No.: PCT/EP2006/011745
§ 371 (c)(1),
(2), (4) Date: Oct. 23, 2008

(87) PCT Pub. No.: WO2007/079848
PCT Pub. Date: Jul. 19, 2007

(65) Prior Publication Data
US 2009/0214289 A1 Aug. 27, 2009

(30) Foreign Application Priority Data
Dec. 30, 2005 (DE) .......................... 10 2005 063 028

(51) Int. Cl.
*F16B 21/02* (2006.01)
(52) U.S. Cl. ................. 24/458; 24/289; 24/293; 24/297
(58) Field of Classification Search ............... 24/457, 24/458, 292–295, 297, 290; 403/374.2, 338, 403/373
See application file for complete search history.

(56) References Cited

U.S. PATENT DOCUMENTS

| 3,220,078 | A | | 11/1965 | Preziosi | |
|---|---|---|---|---|---|
| 4,422,222 | A | * | 12/1983 | Notoya | ............................ 24/614 |
| 4,610,588 | A | | 9/1986 | Van Buren, Jr. et al. | |
| 4,698,882 | A | * | 10/1987 | Lang | ............................... 24/289 |
| 5,168,604 | A | * | 12/1992 | Boville | ........................... 24/297 |
| 5,507,610 | A | * | 4/1996 | Benedetti et al. | ............. 411/339 |
| 6,237,970 | B1 | | 5/2001 | Joannou | |
| 6,322,126 | B1 | | 11/2001 | Kraus | |
| 6,438,804 | B1 | | 8/2002 | Romero | |
| 6,474,921 | B1 | | 11/2002 | Gordon | |
| 6,565,116 | B1 | | 5/2003 | Tajima et al. | |
| 6,715,185 | B2 | * | 4/2004 | Angellotti | ........................ 24/297 |
| 6,976,292 | B2 | | 12/2005 | MacPherson et al. | |

(Continued)

FOREIGN PATENT DOCUMENTS

DE 2227097 A 12/1973

(Continued)

*Primary Examiner* — Robert J Sandy
*Assistant Examiner* — Rowland D Do
(74) *Attorney, Agent, or Firm* — Baker & Daniels LLP

(57) ABSTRACT

A device for fastening an add-on part to a support part is equipped with a fastening bracket, which has a flat cover plate and, at opposite sides, bracket arms which are attached to the cover plate, and with a bearing part which can be connected to the fastening bracket. The bearing part has a receiving space in which the cover plate of the fastening bracket is mounted so as to be rotatable between a locking position, in which the bracket arms engage behind the support part, and a release position in which the bracket arms are not in engagement with the support part. In this way, an add-on part can be connected to and disconnected again from a support part in an efficient and reliable manner.

7 Claims, 4 Drawing Sheets

U.S. PATENT DOCUMENTS

| | | | |
|---|---|---|---|
| 7,152,281 B2 * | 12/2006 | Scroggie | 24/297 |
| 7,267,361 B2 | 9/2007 | Hofmann et al. | |
| 7,272,873 B2 * | 9/2007 | Nessel et al. | 24/297 |
| 2001/0032377 A1 * | 10/2001 | Lubera et al. | 24/293 |
| 2005/0095080 A1 | 5/2005 | Kim | |

FOREIGN PATENT DOCUMENTS

| | | |
|---|---|---|
| DE | 3511070 C2 | 10/1985 |
| DE | 3524651 A1 | 6/1986 |
| DE | 4309024 A1 | 9/1994 |
| DE | 60207335 T2 | 8/2006 |
| EP | 0743461 A1 | 11/1996 |
| EP | 0967135 A2 | 12/1999 |
| EP | 0967136 A2 | 12/1999 |
| FR | 2761422 A1 | 10/1998 |
| GB | 1362158 | 7/1974 |
| GB | 2300878 A | 11/1996 |

* cited by examiner

DEVICE FOR FASTENING AN ADD-ON PART TO A SUPPORT PART

CROSS-REFERENCE TO RELATED APPLICATION

This application is a U.S. National Phase Patent Application based on International Application Ser. No. PCT/EP2006/011745 filed Dec. 7, 2006, the disclosure of which is hereby explicitly incorporated by reference herein.

BACKGROUND OF THE INVENTION

1. Field of the Invention.

The invention is directed to a device for fastening an add-on part to a support part.

2. Description of the Related Art.

One device for fastening an add-on part to a support part is known from DE 35 24 651 A1. The prior device for fastening an add-on part to a support part is equipped with a fastening bracket that is to be positioned in an aperture in the support part and is configured with a cover plate and two bracket arms disposed on opposite sides of the cover plate. Each bracket arm has an inner limb, joined to the cover plate, and an outer limb, said outer limb being connected to the inner limb by a bent section and extending into the region of the cover plate by a free end disposed oppositely from the bent section. Also present is an engaging unit in the form of a screw that can be brought into engagement with the fastening bracket and the add-on part. To bring this about, the screw engages through an aperture in the add-on part and comes into engagement with a thread region configured in the cover plate, whereupon the bent sections of the free ends of the outer limbs brace themselves against the back side of the support part, i.e., the opposite side from the add-on part.

When the screw is tightened, assuming that the cover plate and the outer limb are properly arranged, the outer limbs spread outward and thereby increase the pull-out strength of the prior device. The fastening operation is relatively time-consuming, however, since a great many turns must be execute to tighten the screw.

SUMMARY OF THE INVENTION

The present invention provides a device for fastening an add-on part to a support part, by means of which an add-on part can be connected to and disconnected again from a support part in a very efficient and reliable manner.

By virtue of the fact that in the device according to the invention, the fastening bracket is mounted in a receiving space of the bearing part so as to be rotatable between a locking position and a releasing position, the bracket arms can be arranged, by rotating the fastening bracket for example 90 degrees, in such a way that the connection between the add-on part and the support part is established or released again.

In one form thereof, the present invention provides a device for fastening an add-on part to a support part and equipped with a fastening bracket that has a flat cover plate and bracket arms that are joined to opposite sides of the cover plate, and with a bearing part that can be connected to the fastening bracket, characterized in that the bearing part has a receiving space in which the cover plate of the fastening bracket is mounted so as to be rotatable between a locking position, in which the bracket arms engage behind the support part, and a releasing position, in which the bracket arms are out of engagement with the support part.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
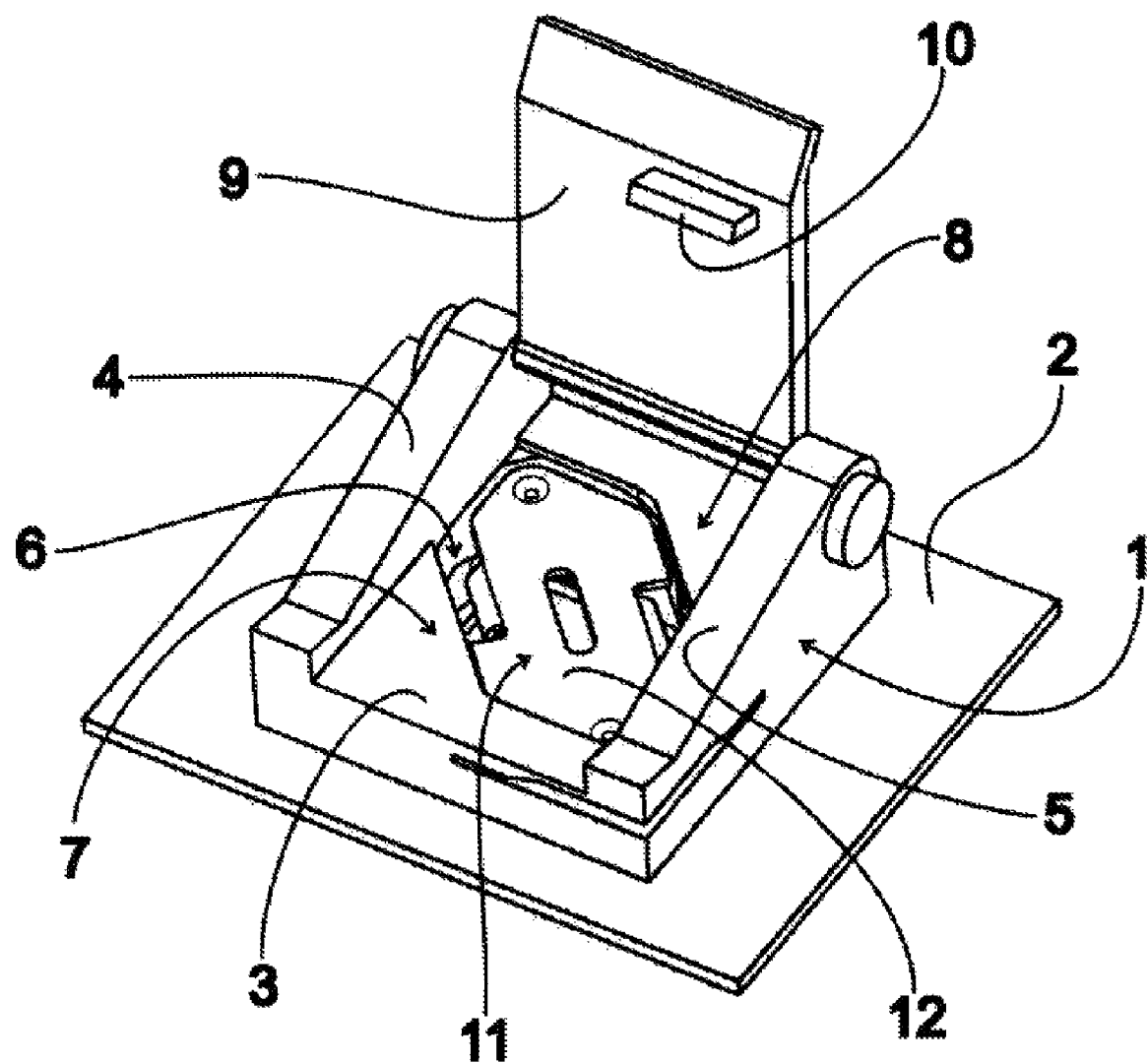
FIG. 1 is a perspective view of an exemplary embodiment of a device according to the invention, with a fastening bracket in a laid-in position.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of a device according to the invention for connecting an add-on part 2, which is connected to a bearing part 1 of the inventive device, to a support part not shown in FIG. 1. The bearing part 1 is configured with a base plate 3, on which are formed side walls 4, 5 that protrude above the base plate 3 on mutually opposite edge sides. The base plate 3 is configured with, as a receiving space, a bracket receiving space 6 that is ordinarily configured as substantially rectangular, but can also, as in this exemplary embodiment, be square, and into which extend, as elements of engaging structures, diagonally mutually opposite corner sections 7, 8, and which is thereby given an orientation that is rotated 45 degrees with respect to the side edges of the rectangular base plate 3.

Mounted on the side walls 4, 5 of bearing part 1 is a pivotable capping flap 9, which comprises, as a blocking projection, a square-shaped blocking rib 10. The capping flap 9 is configured such that it can be pivoted into a closed position in which it terminates flush with the cover sides of the side walls 4, 5, i.e., the sides facing away from the base plate 3, and in which blocking rib 10 then extends into receiving space 6.

It is further evident from FIG. 1 that the device according to the invention is equipped with a fastening bracket 11 made from a stamped metal sheet and configured with a flat cover plate 12 that is fitted to the outer contour of bracket receiving space 6. In the arrangement according to FIG. 1, fastening bracket 11 is disposed in a laid-in position in bracket receiving space 6 of bearing part 1, in which position the outer edge sides of cover plate 12 are arranged parallel to and opposite the inner edge sides of base plate 3, i.e., the edge sides defining bracket receiving space 6.

Figure 2:
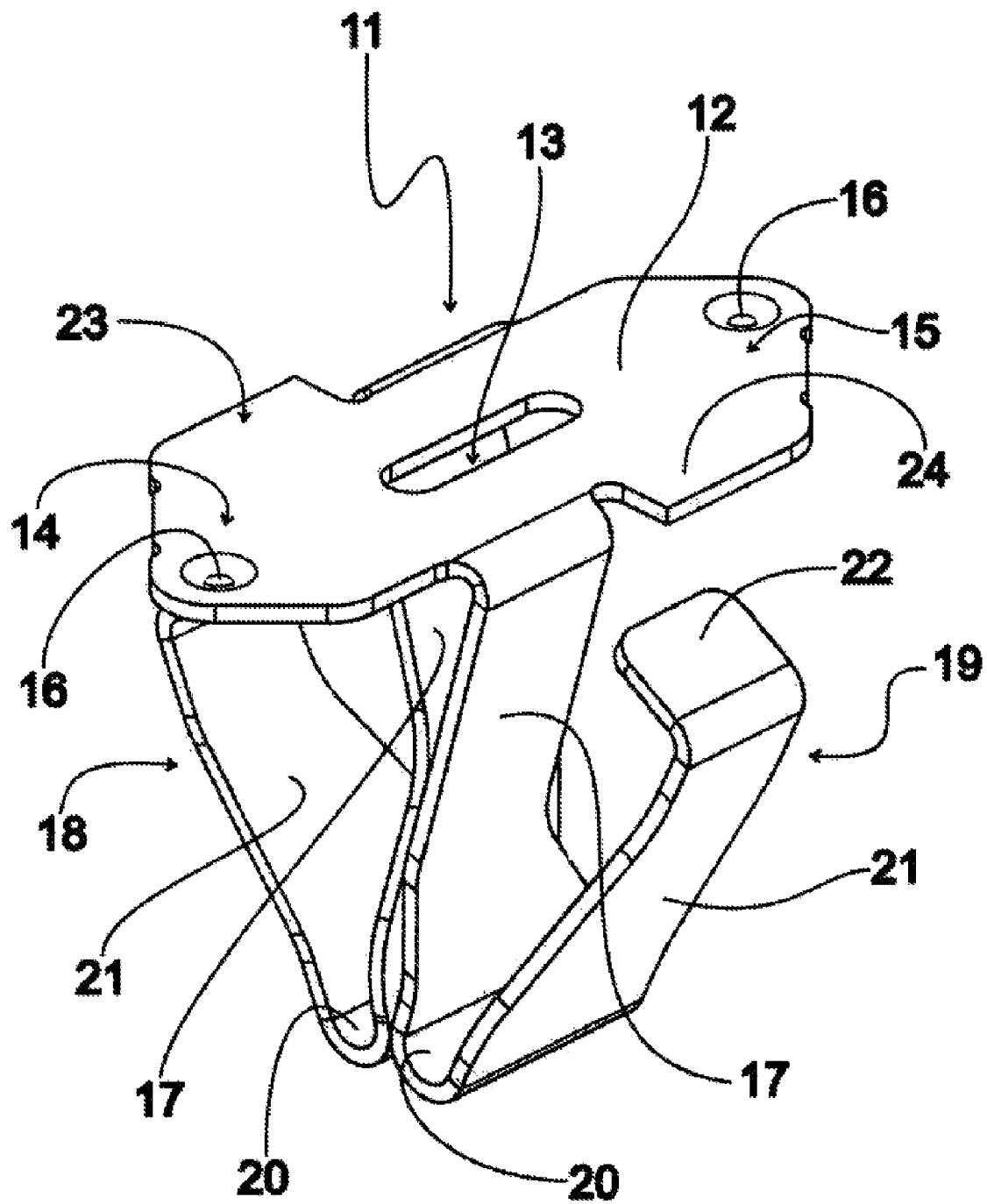
FIG. 2 is a perspective view of the fastening bracket of the exemplary embodiment according to FIG. 1.

FIG. 2 is a perspective view of the fastening bracket 11 from the exemplary embodiment according to FIG. 1. It can be seen from FIG. 2 that cover plate 12, which is configured as substantially elongate, with a rectangular basic shape, is configured in the central region with a contoured aperture 13 in the form of a longitudinal slit, which is shaped complementarily to blocking rib 10. Cover plate 12 is provided at its ends with edge sections 14, 15 having oblique edges that extend toward each other at an angle of about 90 degrees symmetrically to the longitudinal axis, while configured as elements of engaging structures in the respective end regions of edge sections 14, 15 are latching beads 16 that protrude from one side of cover plate 12.

Formed on each of two opposite edge sides of cover plate 12 is an inner limb 17 of a first bracket arm 18 and of a second bracket arm 19, respectively, said inner limbs 17 of the bracket arms 18, 19 extending toward each other away from cover plate 12 and each transitioning, at their ends directed away from cover plate 12, into a respective bent section 20, on each of which, in turn, is formed an outer limb 21 of a respective bracket arm 18, 19. The outer limbs 21 extend from the particular bent section 20 in the direction of cover plate 12, an end section 22 of each outer limb 21 that is located oppositely from bent section 20 being bent approximately at right angles in the direction of cover plate 12.

Cover plate 12 is further configured with side lobes 23, 24, which are disposed diametrically opposite each other relative to contoured aperture 13 and each extend in the direction of an outer leg 21 of a respective bracket arm 18, 19 and are disposed between an inner leg 17 of the particular bracket arm 18, 19 and a respective edge section 14, 15.

Figure 3:
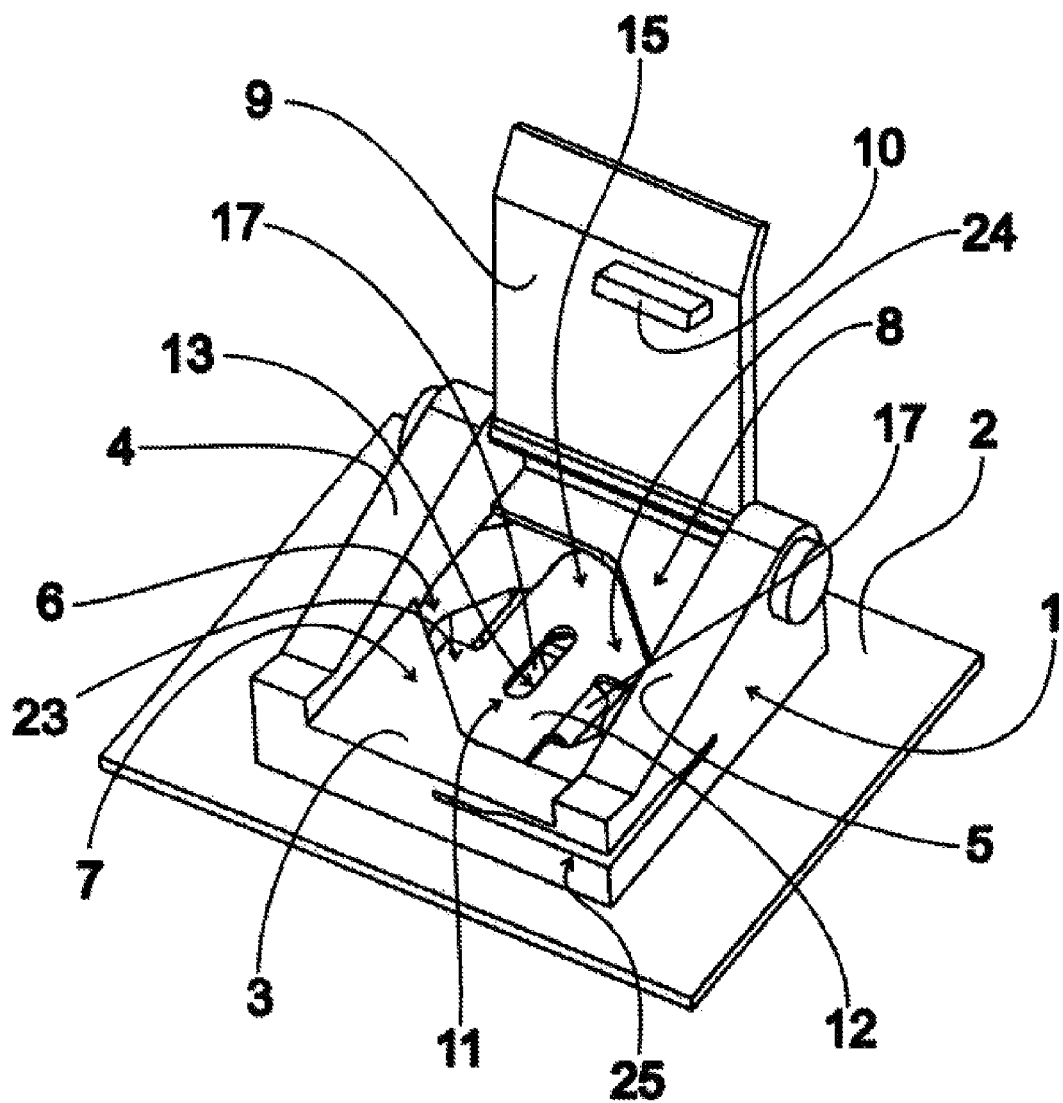
FIG. 3 is a perspective view of the exemplary embodiment according to FIG. 1 and FIG. 2, with a cover plate of the fastening bracket in a releasing position.

FIG. 3 shows the exemplary embodiment according to FIG. 1 with the fastening bracket 11 according to FIG. 2 in a releasing position, which is rotated 45 degrees from the laid-in position according to FIG. 1, and in which the side lobes 23, 24 are sectionally covered by corner sections 7, 8. In this arrangement, the latching beads 16 engage in indentations in the engaging structures, such that a certain safety resistance has to be overcome in order to rotate fastening bracket 11 back from the releasing position according to FIG. 3 into the laid-in position according to FIG. 1.

To move the fastening bracket 11 between the laid-in position according to FIG. 1 and the releasing position according to FIG. 3, the blade of a screwdriver is expediently inserted in contoured aperture 13 and the screwdriver turned accordingly. It can further be appreciated from FIG. 3 that receiving slots 25 are configured in mutually opposite corner regions of base plate 3 to receive edge sections 14, 15.

Figure 4:
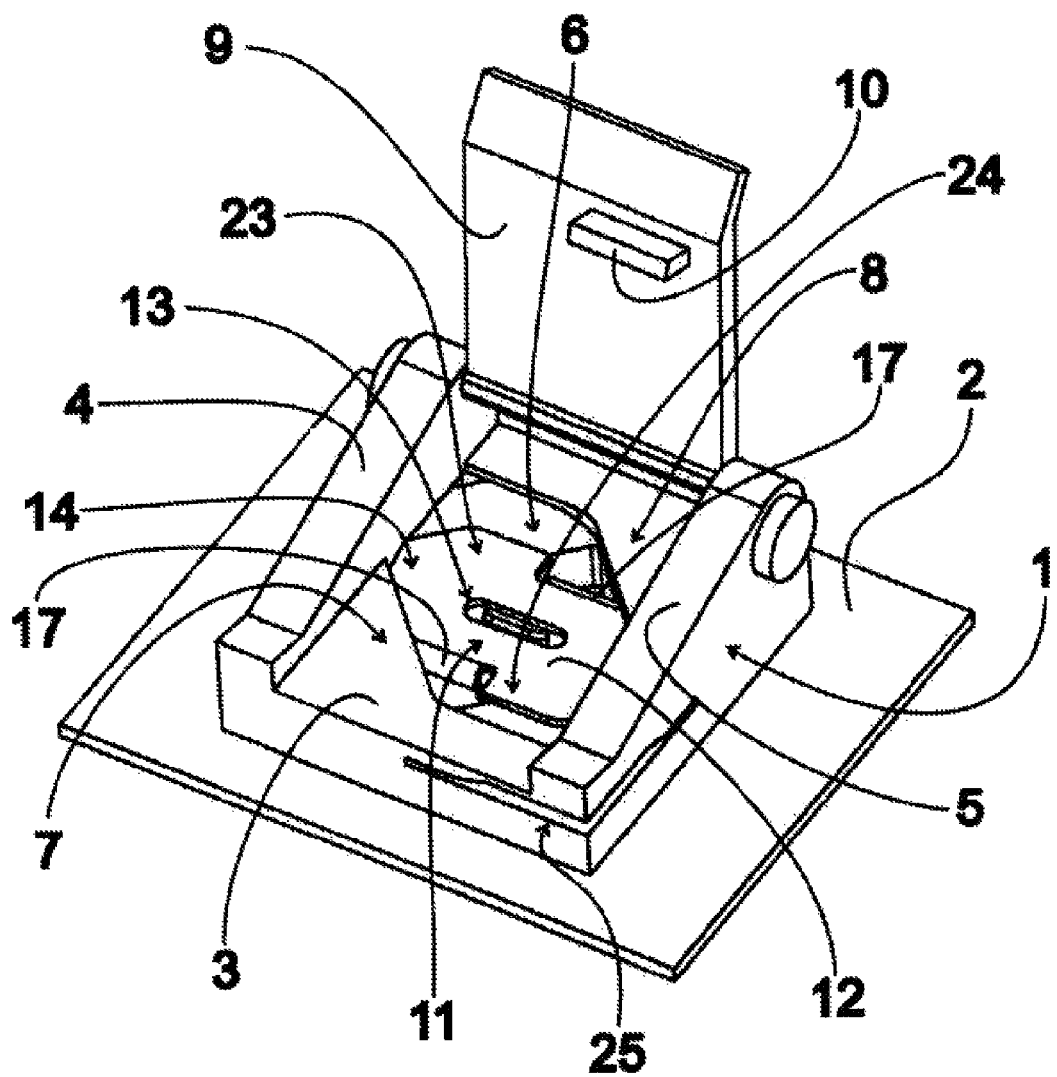
FIG. 4 is a perspective view of the exemplary embodiment according to FIG. 1 and FIG. 2, with the cover plate of the fastening bracket in a locking position.

FIG. 4 is a perspective view of the exemplary embodiment according to FIG. 1 with the fastening bracket 11 according to FIG. 2 in a blocking position, which is rotated 90 degrees from the releasing position according to FIG. 3 and in which the bracket arms 18, 19 engage behind the support part (not shown) and their end sections 22 bear against the back-side edge regions, i.e., those opposite from bearing part 1, of the support part aperture. In the blocking position according to FIG. 4, the latching beads 16 also engage in indentations in the engaging structures, such that a releasing resistance also must be overcome in order to move the fastening bracket 11 from the blocking position according to FIG. 4 back into the releasing position according to FIG. 3.

It can further be understood from the representation according to FIG. 4 that in the blocking position of fastening bracket 11, contoured aperture 13 and blocking rib 10 are arranged such that when capping flap 9 is moved from the open position according to FIG. 4 to the closed position in which it terminates flush with the cover sides of side walls 4, 5, i.e., the sides facing away from base plate 3, blocking rib 10 engages in contoured aperture 13 and thereby fixes fastening bracket 11 in the blocking position.

The blocking position according to FIG. 4 is usefully also the delivery position, so the device according to the invention can be passed through the apertures in add-on part 2 and the support part without any prior manipulation, in order to establish the connection between add-on part 2 and the support part directly.

The side walls 4, 5 and the capping flap 9 are usefully configured with guard means, not illustrated in the figures, which allow capping flap 9 to be lifted out of the closing position only by deliberate manipulation, for example by applying an opening force that is substantially greater than that necessary to freely pivot the cover plate 9. Reliable securing of the fastening bracket 11 in the blocking position is achieved in this way.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for fastening an add-on part to a support part, comprising:
a fastening bracket including a cover plate and bracket arms joined to opposite sides of said cover plate, said cover plate including a contoured aperture; and
a bearing part connectable to said fastening bracket, said bearing part including a receiving space in which said cover plate of said fastening bracket is mounted, said cover plate rotatable between a locking position, in which said bracket arms are engagable behind the support part, and a released position, in which said bracket arms are disposed out of engagement with the support part;
said bearing part further including a blocking projection formed on a capping flap that is pivotably connected to said bearing part, said bearing part configured complementarily to said contoured aperture of said cover plate and which, in said locking position, is engageable with said contoured aperture whereby rotation of said fastening bracket from said locking position to said releasing position is blocked.

2. The device of claim 1, wherein said cover plate includes longitudinal edges, and side lobes projecting from said longitudinal edges.

3. The device of claim 1, wherein said receiving space includes receiving slots disposed proximate said edges, said receiving slots receiving edge sections of said cover plate.

4. The device of claim 3, wherein said cover plate of said fastening bracket is out of engagement with said receiving slots in a laid-in position.

5. The device of claim 1, wherein said bearing part and said cover plate are configured with engaging structures which, in each of said locking position and said releasing position, are detachably engaged with one another.

6. The device of claim 5, wherein said engaging structures include respective complementary protuberances and indentations.

7. The device of claim 1, wherein, when said blocking projection is in engagement with said contoured aperture, said capping flap covers said receiving space on an opposite side thereof from said support part.

* * * * *